Aug. 21, 1928. Re. 17,068

J. G. PETERSON

ELECTRIC CONNECTING PLUG

Original Filed May 9, 1924

Inventor
Johann G. Peterson
by Grace L. [illegible]
Attorney.

Reissued Aug. 21, 1928. Re. 17,068

UNITED STATES PATENT OFFICE.

JOHANN G. PETERSON, OF WEST HARTFORD, CONNECTICUT.

ELECTRIC CONNECTING PLUG.

Original No. 1,537,689, dated May 12, 1925, Serial No. 712,036, filed May 9, 1924. Application for reissue filed September 22, 1926. Serial No. 137,142.

This invention relates to an electric connecting plug, the principal object of the invention being to furnish an article of the nature set forth which is an improvement over the construction of a co-pending application, and is adapted for exceedingly inexpensive manufacture while maintaining its efficiency and increasing its safety.

In the drawing accompanying and forming part of the present specification, I have shown a highly advantageous form of embodiment of the invention, which, to enable those skilled in the art to practice the same, will be set forth fully in the following description. I am not restricted to this disclosure. I may depart therefrom in a number of particulars within the scope of the invention defined by the claims following said description.

Referring to said drawing.

Figure 1:
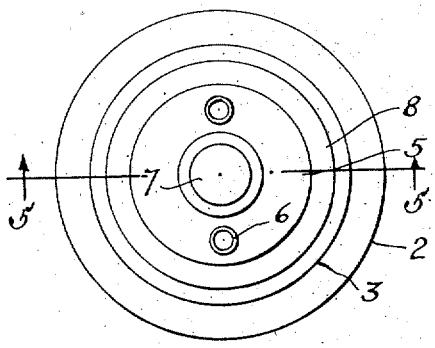
Fig. 1 is a bottom plan of the plug.
Figure 4:
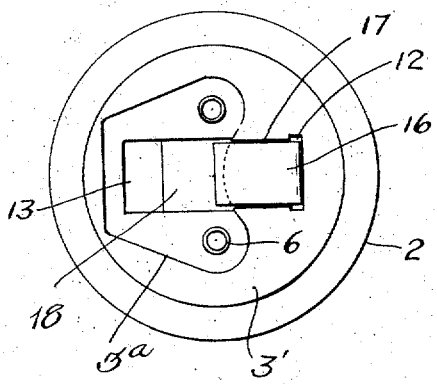
Fig. 4 is a bottom plan view with the insulating disc removed.
Figure 2:
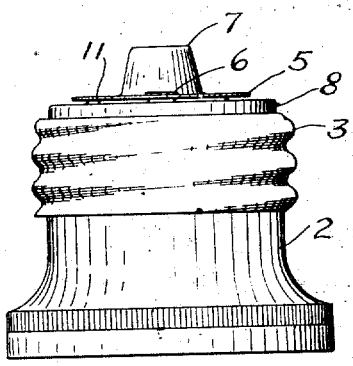
Fig. 2 is a side elevation.

The article represented involves in its make-up a body, such as 2, which is of the general form described in my application mentioned above. The body has fitted to its inner end a side contact or shell 3 of screw type, which shell has a flanged or bottom portion, as 3′, similar to that in my above mentioned application, fitted against the inner face flatwise of the body 2 in a well known manner. Over the flanged bottom 3′ of the shell 3 fits a concentric thin flat insulating disc 8, preferably of fiber or other non-brittle material, while disposed concentrically with this disc and above the upper surface thereof is a central tubular, and preferably slightly conical, projection or outstanding hollow portion 7 which constitutes the central end contact of the plug, the general construction being similar to that described in my above mentioned application, but the several parts herein being improved and held in place by improved and simplified means acting not only to hold the central contact in position, but to clamp together the several parts of the complete plug as hereinafter brought out.

Herein the central contact 7 has an imperforate top, giving a more smooth contact surface of greater effectiveness and a larger surface particularly at its axis. Moreover, while the shape of the contact surface may be varied, the same herein has a flat surface, thereby providing a surface contact of substantial area. The contact 7 herein is also provided with laterally extending means at its base, herein in the form of a flat annular base flange 5, providing an improved contact engaging surface, the flange form of the same especially providing a large stable base and a more rigid and strong central contact construction capable of being very cheaply produced and, due to its symmetry, also very conveniently and cheaply assembled. Herein, it will be noted that this flange 5 is provided with suitable perforations therein, herein diametrically oppositely located relative to the axis of the member 7. Also, short hollow rivets 6 of small diameter are seated in the end of the base 2 and extended upward therefrom through suitable perforations in the insulating disc 8 and these perforations in the flange 5. Thus, the rivets 6 operate not only to hold the disc 8 in position, but also, through the cooperation of the flange 5, to hold the central contact 7 and all of the parts of the device in assembled relation clamped firmly to the base 2, as will hereinafter more fully appear. Herein, these rivets 6 are also insulated from the shell 3, an enlarged aperture $3^a$ in the shell being provided through which the rivets 6 are passed, and the size of this aperture $3^a$ being such as to cause the rivets to be substantially spaced from the shell and thus to insulate the rivets effectually from the shell.

The insulating disc 8 herein also has in it a slot 9, parallel to a line extending through both rivets 6 and laterally spaced therefrom with its ends equally spaced from said rivets. This slot 9 is herein adapted to receive the butt end of a contact 10 which, as represented, is furnished with an inward right angled extension 11 overlying the disc 8 and disposed between the same and the flange 5 on the contact 7. Thus, the butt end 11 of the contact 10 herein is also clamped between the two parts 7 and 8 by the same means which clamps the central contact 7 and the disc 8 to the body. Obviously, the length of this bent-over portion may be varied as desired so long as a proper clamping action, calculated to give a good electrical connection, is obtained. Preferably, however, as herein, the same is of such length as to extend across the axis of the contact 7 and underlie the flange 5 on opposite sides of the latter thereby insuring a better contact and a more strong and rigid construction.

Figure 5:
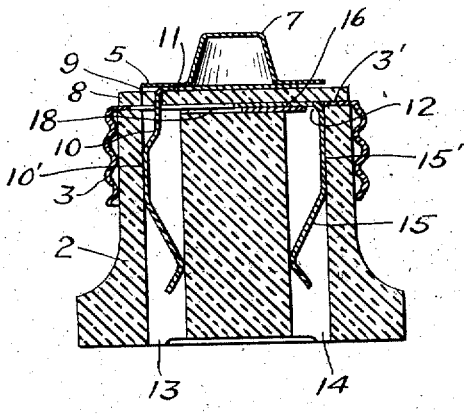
Fig. 5 is a longitudinal central sectional view of the plug.
Figure 3:
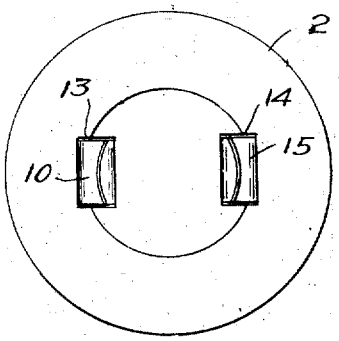
Fig. 3 is a top plan view.

Attention is also directed to the fact that the inner end of the contact 10 is herein of improved form in longitudinal section and disposed in a passage 13 of rectangular cross section and extending longitudinally of the body 2 beneath the slot 9 in the disc 8, as best illustrated in Fig. 5; the contact 10 herein being of substantially the width of the passage 13, and further, so bent between its ends as to provide a flat surface 10′ engaging the outside wall of the passage 13 between other portions of the contact spaced from that wall, while the extremity of the contact engages the opposite wall thereof.

Parallel with the passage 13, but symmetrically disposed on the opposite side of the axis of the base 2, is also a similar passage 14 which receives a like contact 15 but having a longer portion 15′ engaging the outer wall of the passage 14 and extending in contact with that wall approximately to the outer bent end 16 of the contact. Herein, the outer end 16 of the contact 15 extends through a slot 12 in the base 3′ of the conducting shell 3 and is also bent at right angles, electrical connection with the base 3′ being established by a suitable length of the bent-over end being disposed in a correspondingly shaped depression 17 in the base 3′ and between the latter and the inner surface of the disc. Thus, the contact 15 is also clamped in position when the parts are clamped together by the means clamping the other parts together.

It will also be noted that the body 2 and the shell 3 are locked against relative rotation by seating the depression 17 in a correspondingly shaped slot 18 formed in the outer surface of the body 2 and herein extending across between the passages 13 and 14. Here also it will be obvious that the length of the bent-over end of the contact and of the depression in the part 3′ may be varied as desired, so long as the desired electrical connection and seating of the contact is obtained, although a bent over portion of substantial length, such as shown, is preferred.

In my improved construction, it will be noted that while retaining my improved raised hollow central contact and the thin insulating disc associated therewith and effecting other improvements enumerated above, the bent-over end 11 of the contact 10 is effectually separated from the contact 15 and the shell 3 by the insulating disc 8, at the same time that it is made possible to cause the same means used to hold the hollow contact in operative relation to its cooperating contact, to perform the additional functions of holding both of the contacts and all of the parts of the plug against longitudinal separation. Moreover, it will be noted that the construction of the center contact 7 and the connections to this contact has been so improved as to give a more effective, simple and rigid construction which may also be made more cheaply. For example, all necessity for providing or connecting a long hollow rivet of large diameter and extending to the top of the central contact, and also providing supplementary rivet means likewise embedded in the base, is eliminated, a single means instead being utilized and this single means being adapted to perform the entire clamping function. Further, through the use of the rivets 6 this single means can be furnished at a cost less than even the one larger rivet. At the same time, the process of assembly is simplified, my improved structure being connectible in a single quick operation and the use of the same making it unnecessary to utilize slower spinning operations. In this connection, attention is directed to the fact that the clamping means is so seated in the flat end of the rugged base and the other parts are so arranged with respect to the clamping means, base, and one another that the device may be riveted together in a press with such a minimum of breakage as to eliminate necessity for utilizing a slow spinning process. I also desire to call attention to the fact that the inner terminal end of the contact 15 extends into a depression in the bottom 3′ of the shell 3, which in turn extends into one end of a corresponding depression extending across the end of the inner portion of the body 2, thus enabling the depression in the shell to act as a key to prevent the shell from turning when the depression in the shell is at either end of the depression in the base, in such a manner that manufacture is simplified and assembly expedited, no necessity now existing for locating the shell in only one position with respect to the base. It should also be noted that the portions 10′, 15′ on the sides of the contacts 10 and 15 engage solidly the rear or outer walls of the passages 13 and 14, respectively, which is an important condition in that a tension on the contacts is assured, the working ends of the contacts normally being pressed against the opposite walls in such manner as to insure a proper contact with the cooperating removable contacts, not shown.

Attention is also directed to the fact that in this construction, as in my prior construction, it is still possible for the central contact of the plug to make contact with the central contact of the socket irrespective of the projection of the socket screws and to eliminate the possibility that these screws will contact with any central contact part and thereby cause a short-circuit, the boss herein being of such dimensions and construction as better to pass between the screws and, through the improved imperforate contact surface provided, make an improved contact with the center contact of the plug, while my improved construction at the base of the boss is such as to be adequately spaced from these screws while obtaining other advantages. Thus, for example, it will be evident that by extending the lateral extension on the cooperating contact through the shallow disc and laterally outside the same beneath the boss, it is made possible to eliminate one rivet and simplify the central contact connections of my previous case, while also simplifying and shortening the cooperating contact as compared with prior devices using high insulation and a low contact extending laterally across the plug closely adjacent its extremity. At the same time, due to the location of the lateral extension of the cooperating contact between the disc and the boss, and due to the clamping action of the dome or boss on this lateral extension, it is made possible for the lateral extension on the contact to reinforce the disc, and hence to make it possible to use a very thin disc while still obtaining a sufficiently rigid construction and a very satisfactory contact connection, the lateral extension on the cooperating contact resting flat on the flat insulating disc and the boss being clamped tightly thereon in such manner as to produce the desired rigidity even with a very thin disc. Further, this construction enables the use of laterally extending means on the base of the boss giving a large contact surface engageable by the lateral extension on the cooperating contact. Where, as is preferred, a peripheral flange is used on the base of the boss and the lateral extension on the cooperating contact engages this flange on opposite sides of the axis of the boss, a plurality of such large contact surfaces is also presented and in any angular position of the symmetrical boss, while the flange also strengthens the boss and enables it also to be made of lighter material if desired. It will also be evident that at the same time that these advantages are obtained it is also made possible, through the stiffening of parts resulting from this improvement, to enable the shell to be made of thinner material than would be the case if the outer periphery of a thin disc was not held rigid. These and other advantages of my improved construction will, however be clearly apparent to those skilled in the art.

While I have in this application specifically described one form which my invention may assume in practice, it is to be understood that this form of my invention is shown for purposes of illustration and that the invention may be modified and embodied in various other forms without departing from its spirit or the scope of the appended claims.

What I claim as new and desire to secure by Letters Patent is:

1. In combination, an insulating base of substantially uniform diameter at one end, a conducting shell on that end of the same, an insulating disc overlying the adjacent ends of said base and shell, a raised hollow central contact outside said disc and of substantially greater height than the latter, contacts in said base having portions on opposite sides of said disc and including one extending through said disc and underlying said raised hollow contact and one engaging said shell, and means insulated from said shell clamping the bottom of said raised hollow contact in engagement with its cooperating contact and also clamping all of the parts to said base.

2. In combination, an insulating base of substantially uniform diameter at one end, a threaded conducting shell on that end thereof, an insulating disc overlying the adjacent ends of said shell and base, a raised hollow central contact outside said disc of substantially greater height than said disc and having laterally extending means at its base, a contact member in said base having a portion extending through said disc and overlying the same in contact with said laterally extending means, a second contact in said base electrically connected with said shell, and means insulated from said shell clamping the laterally extending means on said raised hollow contact in engagement with its cooperating contact and also holding all the parts together.

3. In combination, an insulating base of substantially uniform diameter at one end, a threaded conducting shell on that end thereof, an insulating disc overlying the adjacent ends of said shell and base, a raised hollow central contact outside said disc of substantially greater height than said disc, a contact member in said base having a portion extending through said disc and overlying the same in contact with the base of said hollow central contact on opposite sides of the axis of said central contact, a second contact in said base electrically connected with said shell, and means insulated from said shell clamping the bottom of said raised hollow contact in engagement with its cooperating contact and also holding all the parts together.

4. In combination, an insulating base of substantially uniform diameter at one end, a threaded conducting shell on that end thereof, an insulating disc overlying the adjacent ends of said shell and base, a raised hollow central contact outside said disc of substantially greater height than said disc and having laterally extending means on its base, a contact member in said base having a portion extending through said disc and overlying the same in contact with said laterally extending means on opposite sides of the axis of said hollow contact, a second contact in said base electrically connected with said shell, and a plurality of rivets carried by said base and insulated from said shell and extending through said disc and laterally extending means.

5. In combination, an insulating base of substantially uniform diameter at one end, a threaded conducting shell on that end thereof, a shallow insulating disc overlying the adjacent ends of said shell and base, a raised hollow central contact outside said disc and having a flange around its base, a contact member in said base having a portion extending through said disc and a lateral extension thereon in contact with said flange, a second contact in said base electrically connected to said shell, and means insulated from said shell clamping the flange on said raised hollow contact in engagement with its cooperating contact and also holding all the parts together.

6. In combination, an insulating base of substantially uniform diameter at one end, a threaded conducting shell on that end thereof, an insulating disc overlying the adjacent ends of said shell and base and of substantially the diameter of that end of the base, a raised hollow central contact outside said disc of substantially greater height than said disc and having a flange around its base, a contact member in said base having a portion extending through said disc and a lateral extension thereon in contact with said flange, a second contact in said base electrically connected to said shell, and a plurality of rivets carried by said base and insulated from said shell and extending through said disc and flange.

7. In combination, an insulating base of substantially uniform diameter at one end, a threaded conducting shell on that end thereof, an insulating disc overlying the adjacent ends of said base and shell, a raised hollow central contact outside said disc of substantially greater height than said disc and having a flange around its base, a contact member in said base having a portion extending through said disc and a lateral extension thereon contacting with said flange on opposite sides of the axis of said raised contact, a second contact in said base electrically connected to said shell, and means insulated from said shell clamping the flange on said raised hollow contact in engagement with its cooperating contact and also holding all the parts together.

8. In combination, an insulating base of substantially uniform diameter at one end, a threaded conducting shell on that end thereof, an insulating disc overlying the adjacent ends of said base and shell, a raised hollow central contact outside said disc of substantially greater height than said disc and having a flange around its base, a contact member in said base having a portion extending through said disc and a lateral extension thereon contacting with said flange on opposite sides of the axis of said raised contact, a second contact in said base electrically connected to said shell, and a plurality of rivets carried by said base and insulated from said shell and extending through said disc and flange.

9. In combination, an insulating base of substantially uniform diameter at one end, a threaded conducting shell on that end thereof having a top overlying said end, an insulating disc overlying the adjacent ends of said shell and base, a raised hollow central contact member outside said disc of substantially greater height than said disc and presenting an imperforate outer central contact surface, a contact member in said base electrically connected to the top of said shell and insulated from said raised hollow central contact, and a second contact member in said base electrically connected to the bottom of said raised hollow central contact and insulated from said shell parts.

10. In combination, an insulating base of substantially uniform diameter at one end, a threaded conducting shell on that end thereof, an insulating disc overlying the adjacent ends of said shell and base and of substantially the same diameter as that end of the latter, a raised hollow central contact member outside said disc of substantially greater height than said disc presenting an imperforate outer central contact surface and having a flange around its base, a contact member in said base having a portion extending through said shell and disc and insulated from the former and having a lateral extension underlying said flange and lying flat on the outer surface of said disc, and a second contact in said base electrically connected to said shell and insulated from said central contact parts.

11. In combination, an insulating base of substantially uniform diameter at one end, a threaded conducting shell on that end thereof, an insulating disc overlying the adjacent ends of said shell and base and of substantially the same diameter as that end of the latter, a raised hollow central contact member outside said disc of substantially greater height than said disc presenting an imperforate outer central contact surface and having a flange around its base, a contact member in said base insulated from said shell and having a portion extending through said disc and a lateral extension thereon underlying said flange and resting flat on the outer surface of said disc in engagement with said flange on opposite sides of the axis of said hollow contact, and a second contact in said base electrically connected to said shell and insulated from said central contact parts.

12. In combination, an insulating base of substantially uniform diameter at one end, a threaded conducting shell on that end thereof, a shallow insulating disc overlying the adjacent ends of said shell and base, a raised hollow central boss member outside said disc and having a peripheral flange around its base for stiffening both the disc and the boss and spaced substantially from the inner end of the boss and extending laterally over the shallow disc, a contact member in said base insulated from said shell and having a portion extending through said disc and a lateral extension underlying the flange on said boss and in contact therewith, a second contact in said base electrically connected to said shell and insulated from said central contact parts, and upstanding rivet means embedded in said base and insulated from said shell extending through said disc and boss and holding all the parts in assembled relation.

13. In combination, a conducting shell having a depressed portion in its upper surface adapted to receive a lateral extension of a contact, and a cooperating insulating base received in said shell and having correspondingly depressed means in its end whereby said shell may be assembled thereon in a plurality of positions with said depressed portion on the shell so seated in the corresponding depressed means in said base as to prevent relative rotation, said last mentioned means including a transverse slot adapted to receive the depressed portion on said shell in either end thereof.

14. In combination, an insulating base having contact apertures therein, a threaded conducting shell fitted over one end thereof and having a depressed portion, a center contact insulated from said shell, contact members in said apertures in the base and connected to said shell and center contact, means for holding said center contact in contact with its cooperating contact also functioning to hold all the parts against longitudinal separation, and means independent of said last mentioned means but held in position thereby for preventing relative rotation between said base and shell and including a recess in said base extending across between the inner ends of said apertures and adapted to receive said depressed portion in either end thereof.

15. A connecting plug comprising a body of insulating material having parallel passages therein, a threaded contact shell fitted over an end of the body and having a portion engaging an end of the body, an insulating disc fitting against said shell portion, two rivets embedded in said end of the body and insulated from said shell extending through the shell and also through the disc, another conducting disc fitted against the other disc and perforated to receive said rivets, the rivets being extended through both discs and headed over on an outer face of the outer disc, the latter disc having a central end contact, and two contacts fitted in the passages, one of which is electrically connected to said shell and the other to said central end contact.

16. A connecting plug comprising a body of insulating material having parallel passages therein, a threaded contact shell fitted over an end of the body and having a portion engaging said end, a disc fitting against said portion and of insulating material, two hollow rivets embedded in the end of said body and insulated from said shell extending through the shell and also through the disc, a conducting disc outside the other disc perforated to receive the rivets which extend through both discs and are headed over on an outer surface of the outer disc, the latter having a raised central projection which is hollow and of substantially greater height than said first disc, and two contacts fitted in the passages, one of which has a portion bent to engage the end portion of said shell while the other has a portion extending through a slot in the insulating disc and bent to lie between the conducting disc and the insulating disc.

17. A connecting plug comprising a body of insulating material having parallel bores, a threaded contact shell fitted over an end of the body and having an end flange engaging an end of the body, an insulating disc fitting against the flange, the body having two hollow rivets embedded therein, extending through the shell and also through the disc, a conducting disc fitted against the other disc, perforated to receive said rivets, the rivets being extended through both discs and headed over the outer face of the outer disc, the latter disc having a central end contact, and two contacts fitted in the respective bores, one of which has a portion bent between the end flange and said insulating disc, the other having a portion extending through a slot in the insulating disc and clamped by the conducting disc to the insulating disc.

18. A connecting plug comprising a body of insulating material having parallel bores, a threaded contact shell fitted over an end of the body and having an end flange engaging an end of the body, a disc fitted against the flange and formed of insulating material, the body having two hollow rivets embedded therein and extending through the shell and also through the disc, a conducting outer disc fitting against the other disc perforated to receive the rivets which extend through both discs and which are headed over the outer face of the outer disc, the latter having a central projection which is hollow and which functions as a central end contact, and two contacts fitted in the respective bores, one of which has a portion bent between the end flange and said insulating disc, the other having a portion extending through a slot in the insulating disc and clamped by the conducting disc to the insulating disc.

19. A connecting plug comprising a body of insulating material having parallel bores, a threaded contact shell fitted over an end of the body and having an end flange engaging an end of the body, an insulating disc fitting against the flange, the body having two rivets embedded therein, extending through the shell and also through the disc, a conducting outer disc fitted against the other disc, the rivets being extended through both discs and headed over the outer surface of the outer disc, the latter disc having a central end contact, and two resilient contacts fitted in the respective bores, one of which has a portion in contact with the end flange and said insulating disc, the other having a portion clamped by the conducting disc against the insulating disc, the two contacts having resilient portions in contact with the outer surface of said bores to stiffen said resilient portions.

20. An attachment plug comprising an insulating body, a conducting shell seated thereon, a shallow insulating disc seated on the inner end of said shell, an outstanding central boss outside said disc forming a raised projection of smaller diameter than the disc and of substantially greater height than the latter at the axis of the disc, contacts projecting into said body insulated from one another and having lateral extensions each parallel to said disc and between said boss and body and respectively electrically connected to said shell and boss, one of said extensions being disposed between said disc and the insulating body and electrically connected to said shell while the other extends through said disc and laterally outside said disc and under the base of said boss and in contact with the latter, and means insulated from said shell extending through said disc and boss and holding all the parts in assembled relation.

In testimony whereof I affix my signature.

JOHANN G. PETERSON.